United States Patent [19]

Beck

[11] 4,117,865

[45] Oct. 3, 1978

[54] AIR OVER OIL HIGH PRESSURE MODULATING VALVE

[76] Inventor: Earl A. Beck, 1762 South Erie Pl., Tulsa, Okla. 74112

[21] Appl. No.: 739,069

[22] Filed: Nov. 5, 1976

[51] Int. Cl.² .......................... F16K 11/14; F15B 0/42
[52] U.S. Cl. .............................. 137/627.5; 137/596.18
[58] Field of Search ............... 137/625.6, 627.5, 596.1, 137/596.18; 303/54

[56] References Cited

U.S. PATENT DOCUMENTS

| | | | |
|---|---|---|---|
| 3,107,693 | 10/1963 | Puster et al. | 137/627.5 |
| 3,977,425 | 8/1976 | Hayashida | 137/627.5 |

*Primary Examiner*—Martin P. Schwadron
*Assistant Examiner*—A. Michael Chambers
*Attorney, Agent, or Firm*—Head, Johnson & Chafin

[57] ABSTRACT

An air over oil high pressure modulating valve comprising dual acting valve members wherein one of said valves is responsive to air pressure acting thereon for opening the other of said valves for directing controlled hydraulic fluid pressure to a brake apparatus, or the like. Upon the application of pneumatic pressure against the first valve member, the second valve member is opened for releasing hydraulic fluid pressure to the brake apparatus for actuation thereof. Upon the release of pneumatic pressure from the first valve member, the second valve member is maintained in a closed position for retaining the hydraulic fluid in a fluid chamber which is in communication with a fluid accumulator. When the pneumatic pressure acting on the first valve is only partially released, the first valve opens communication between the open second valve and the fluid accumulator for reducing the fluid pressure at the brake apparatus.

6 Claims, 5 Drawing Figures

AIR OVER OIL HIGH PRESSURE MODULATING VALVE

CROSS-REFERENCE TO RELATED APPLICATION

This application is relates to Disclosure Document No. 037344, filed Dec. 16, 1974.

BACKGROUND OF THE INVENTION

1. Field of the Invention

This invention relates to improvements in valves and more particularly, but not by way of limitation, to an air over oil high pressure modulating valve.

2. Description of the Prior Art

The present-day industrial scope of hydraulic and pneumatic actuators such as used in heavy truck braking applications usually comprise an air over oil single stroke pressure booster master cylinder. These boosters are large and bulky and have very limited discharge volume per stroke before bottoming out. In order for these devices to provide a high volume pressure compensated pumping system, it would normally be necessary to use four to eight of these large pressure boosters. It will be apparent that not only is the size of the boosters a detriment, but also the expense is excessive.

SUMMARY OF THE INVENTION

The present invention contemplates a novel air over oil high pressure modulating valve particularly designed and constructed for overcoming the above disadvantages. The novel valve comprises a pilot piston in communication with a source of pneumatic pressure and operably connected with a first poppet valve. A second poppet valve is engageable by the first poppet valve for opening thereof upon movement of the first poppet valve in one direction in response to the pneumatic pressure acting on the pilot piston. When sufficiently great pneumatic pressure is applied to the pilot piston, the first poppet valve engages the second poppet valve for opening thereof to release hydraulic fluid to the braking apparatus or the like. When the pneumatic pressure is relieved from the pilot piston, the hydraulic fluid is returned to a hydraulic fluid accumulator, and the second poppet valve is closed for trapping the hydraulic fluid in a fluid chamber, thus releasing the actuation of the braking apparatus. In the event the pneumatic pressure is only partially relieved on the pilot piston, a portion of the hydraulic fluid may be relieved from the braking apparatus for reducing the hydraulic pressure acting thereon.

The controlled hydraulic output pressure of the novel valve is in direct proportion to the pneumatic pressure signal acting on the pilot piston, and which is preferably in a pressure range of approximately 0 to 125 PSI, but not limited thereto. A hydraulic input pressure of approximately three thousand PSI in the hydraulic fluid accumulator will result in a controlled discharge pressure from the valve of zero to three thousand PSI, depending upon the input signal at the pneumatic pilot port. The exact ratio of discharge pressure to the pilot pressure is a function of the area of the pilot piston in relation to the area of the second poppet valve. Of course, the area of the first poppet must be slightly less than the area of the second poppet. The less the difference in area between the two poppets, the less "deadband" between applied and released hydraulic pressure.

BRIEF DESCRIPTION OF THE DRAWINGS

FIG. 1 is a sectional elevational view of a valve embodying the invention, and depicts the valve in an open position for supplying hydraulic pressure to a braking apparatus, or the like.

DESCRIPTION OF THE PREFERRED EMBODIMENTS

Figure 1:
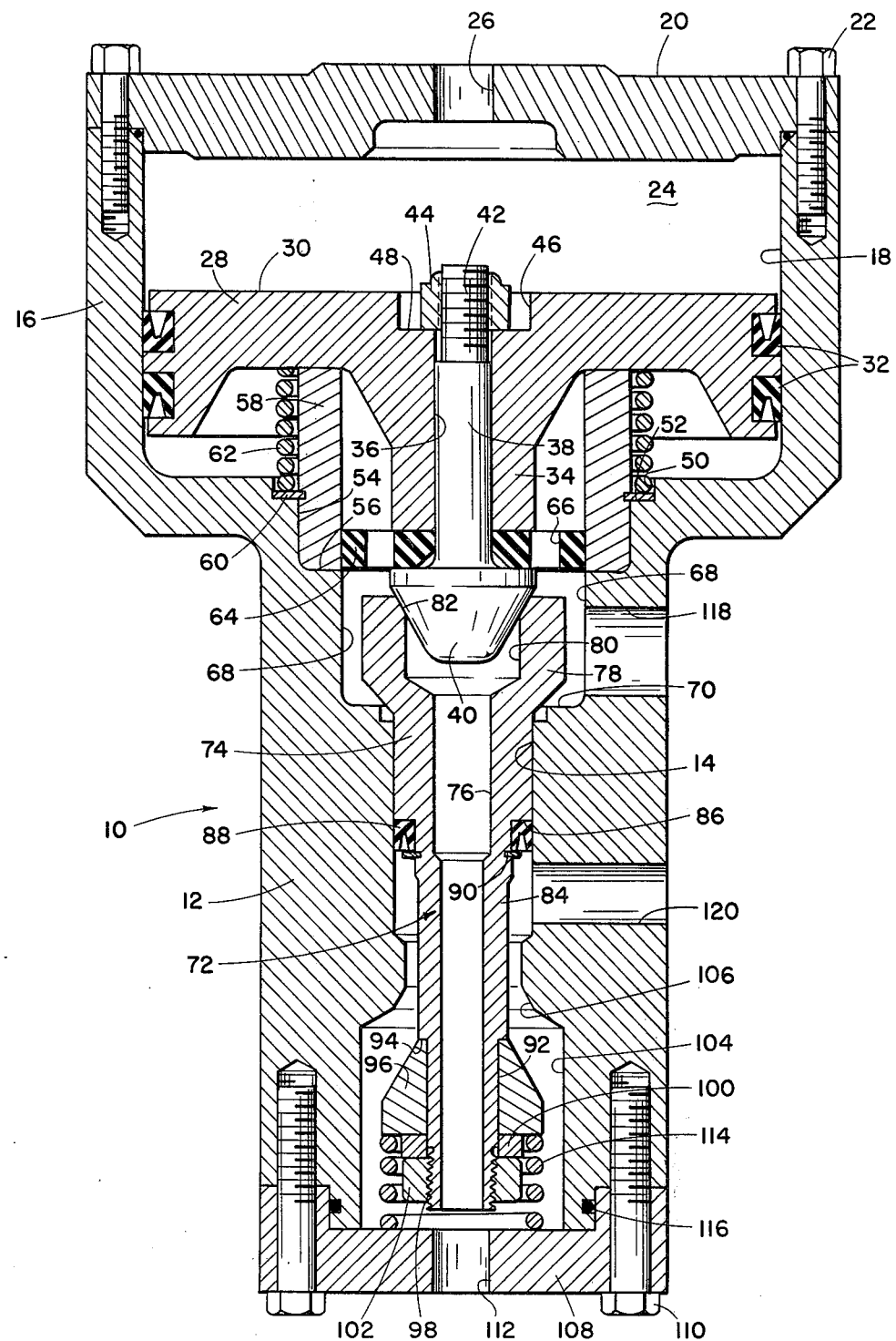

Referring to the drawings in detail, reference character 10 generally indicates a valve comprising a substantially tubular housing 12 having an internal longitudinally extending bore 14 provided therein. The housing 12 is enlarged at one end as shown at 16 for providing an enlarged central bore 18 in communication with the bore 14. A suitable cover member 20 is removably secured to the outer end of the enlarged housing portion 16 in any well-known manner, such as by a plurality of bolts 22. The cover 20 closes the housing portion 16 at one end to provide a chamber 24 therein and is provided with a central bore 26 extending into communication with the chamber 24 for a purpose as will be hereinafter set forth.

A piston member 28 is slidably disposed within the chamber 24 and has one face 30 thereof in open communication with the port 26. Suitable sealing means 32 are provided on the outer periphery of the piston 28 for engagement with the inner periphery of the bore 18 to preclude leakage of fluid therebetween. The piston member 28 includes a centrally disposed rod member 34 extending axially outwardly in a direction away from the piston face 30, and having a central bore 36 extending longitudinally therethrough for slidably receiving the stem 38 of a poppet valve 40 therethrough. The outer end of the stem 38 is preferably threaded, as shown at 42, for receiving a lock nut 44 thereon. The bore 38 is preferably enlarged at 46 to provide an annular shoulder 48 which cooperates with the nut 44 to limit the movement of the valve 40 in the one direction.

The bore 18 is reduced at 50 to provide an annular shoulder 52, and is further reduced at 54 to provide another annular shoulder 56. A sleeve member 58 is disposed on the shoulder 46, and the piston 28 engages the outer end of the sleeve 58 as shown in FIG. 1 for limiting the movement of the piston 28 in one direction. A lock washer 60 is disposed on the shoulder 52 and engages the outer periphery of the sleeve 58 in the well-known manner for securely locking the sleeve 58 in position on the shoulder 50. A suitable helical spring 62 is disposed around the outer periphery of the sleeve 58 and has one end suitably anchored at the lock washer 60 and the opposite end in engagement with the piston 28, as clearly shown in the drawings. The spring 62 constantly urges the piston 28 in a direction toward the cover 20 for a purpose as will be hereinafter set forth.

Figure 2:
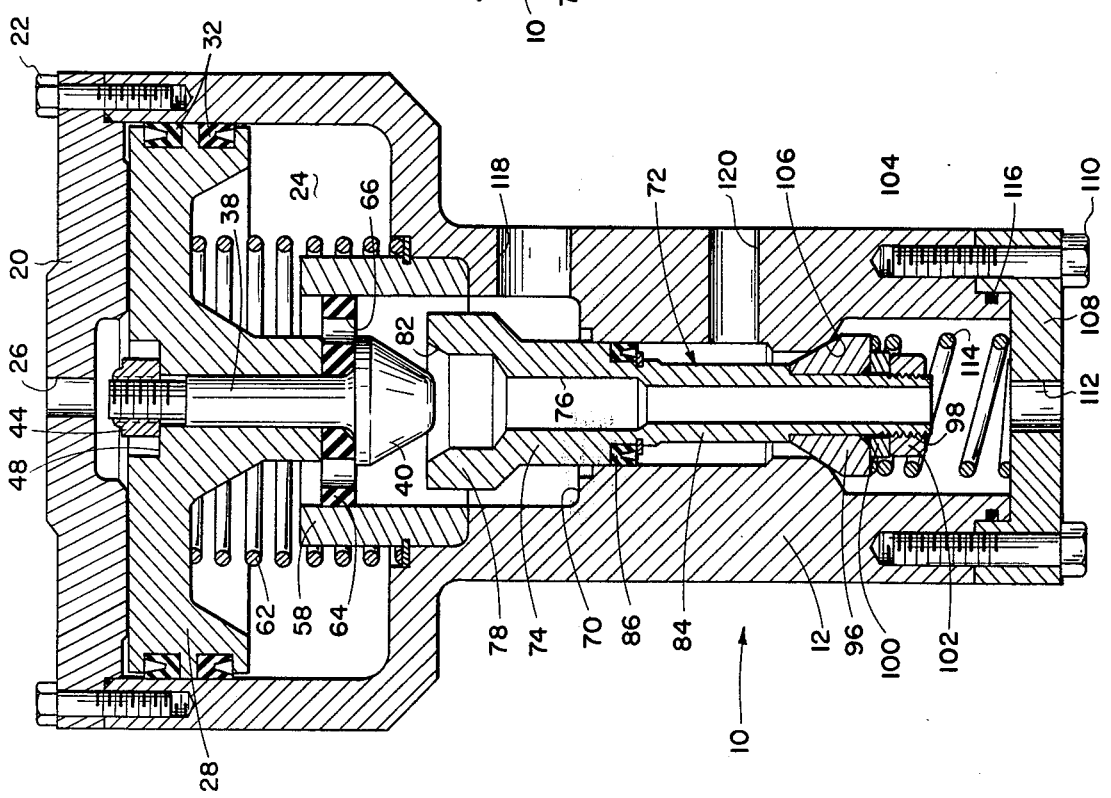
FIG. 2 is a similar view to FIG. 1, on a reduced scale, and depicting the valve in a closed position.

An annular disc 64 is disposed in the lowermost end of the sleeve 58, as viewed in FIGS. 1 and 2, and is preferably constructed of a suitable bearing material, such as nylon, Teflon, or the like, to provide a stabilizer for the valve 40. The disc 64 is provided with a plurality of spaced apertures or ports 66 in order to permit the passage of fluid pressure therethrough in order to alternately relieve the pressure in that portion of the chamber 24 beneath the piston 28, as viewed in FIGS. 1 and 2, and direct pressure fluid thereto, as will be hereinafter set forth.

The bore 14 extends into communication with the bore 54 and is enlarged at 68 to provide an annular shoulder 70. A second poppet valve generally indicated at 72 is slidaly disposed in the bore 14 and comprises a valve stem 74 having a central bore 76 extending longitudinally therethrough to provide a fluid passageway. One end of the stem 74 is enlarged at 78, and the bore 76 is correspondingly enlarged at 80 for receiving the first poppet valve 40 therein in one relative position therebetween, as particularly shown in FIG. 1. The outer edge of the bore 80 is preferably bevelled, as shown at 82, to provide a valve seat for the poppet valve 40.

The stem 74 is reduced at 84 to provide an annular shoulder 86 around the outer periphery thereof. A suitable sealing member 88 is disposed around the outer periphery of the reduced stem portion 84 and is securely retained in position adjacent the shoulder 86 by a suitable lock ring 90. The sealing member 88 engages the inner periphery of the bore 14 for precluding leakage of fluid between the valve stem 74 and the bore 14, as will be hereinafter set forth in detail.

The stem 74 is further reduced at 92 to provide an annular shoulder 94 around the outer periphery thereof for receiving a valve head member 96 thereagainst. The outer end of the reduced stem portion 92 is preferably threaded as shown at 98 whereby a washer 100 may be retained against the valve head 96 by a lock nut 102 for securing the valve head 96 against the shoulder 94. The bore 14 is enlarged at 104 to provide sufficient clearance for the valve head 96, and a bevelled or tapered annular shoulder 106 is interposed between the bore 14 and the enlarged portion 104 to provide a valve seat for the valve head 96.

A cover plate member 108 is removably secured to the lowermost end of the housing 12, as viewed in FIGS. 1 and 2, in any suitable manner, such as by a plurality of spaced bolts 110. A central bore 112 is provided in the cover 108 in substantial alignment with the fluid passageway 76 of the poppet valve 72 and in communication with the bore 104. A helical spring 114 is disposed around the outer periphery of the washer 100 and lock nut 102 and has one end thereof suitably anchored on the cover 108 and the opposite end thereof suitably anchored on the lower end face of the valve head 96. The spring 114 constantly urges the valve head 96 in a direction toward the valve seat 106 to provide a normally closed position for the poppet valve 72. Suitable sealing means, such as an O-ring 116, is interposed between the cover 108 and the valve housing 12 to preclude leakage of fluid therebetween.

A first radial fluid return bore 118 extends through the sidewall of the housing 12 into communication with the bore 68, and a second radial fluid inlet bore 120 extends through the sidewall of the housing 12 in spaced relation to the bore 118 and into communication with the bore 14. It is preferable that the bore 118 be in communication with a hydraulic fluid accumulator 122 (FIG. 3); the bore 120 be in communication with a fluid pump 124; the port 26 be in communication with a source of pneumatic fluid pressure, such as a foot-actuated throttle valve 126 operably connected with an air cylinder 128; and the port 112 be in communication with a braking apparatus 130, but not limited thereto.

In the normal position of the valve 10, as shown in FIG. 2, the spring 62 urges the piston 28 upwardly against the under or lower surface of the cover 20. Simultaneously the spring 114 urges the second poppet valve 96 upwardly against the valve seat 106. With the piston 28 in position against the cover 20, the first poppet valve 40 is removed from the valve seat 82, and communication is thus established between the port 118 and the internal bore 76 of the valve 72, and thence through the port 112. The port 118 is also in communication with the chamber 24 beneath the piston 28, through the bores 66 of the disc 64. However, communication between the ports 118 and 120 is precluded by the seal member 86, and communication between the port 120 and the port 112 is precluded by the engagement of the valve head 96 with the valve seat 106.

When sufficient pneumatic pressure is directed through the port 26 and onto the upper surface of the piston 28 so as to overcome the pressure of the spring 62 and fluid pressure in the chamber 24 beneath the piston 28, the piston 28 will move downwardly. When the piston 28 has moved downwardly a sufficient distance, the valve 40 will seat against the valve seat 82, thus closing the communication between movement of the piston 28, the valve 40 will move the valve 72 downwardly against the force of the spring 114 to move the valve head 96 away from the valve seat 106 and establish communication between the port 120 and the port 112.

In addition to the two positions of the valve 10 as shown in FIGS. 1 and 2, there is an intermediate position when the piston 28 has moved downwardly a sufficient distance for bringing the valve 40 into a sealing engagement with the valve seat 82, but not a sufficient distance for moving the valve head 96 away from the valve seat 106. In this position, any fluid pressure in the bore 76 and therebeyond will be trapped or locked, and no fluid may be added thereto or withdrawn therefrom. Thus a controlled fluid may be locked at the braking apparatus 130, or other hydraulically actuated equipment being controlled by the valve 10.

Figure 3:
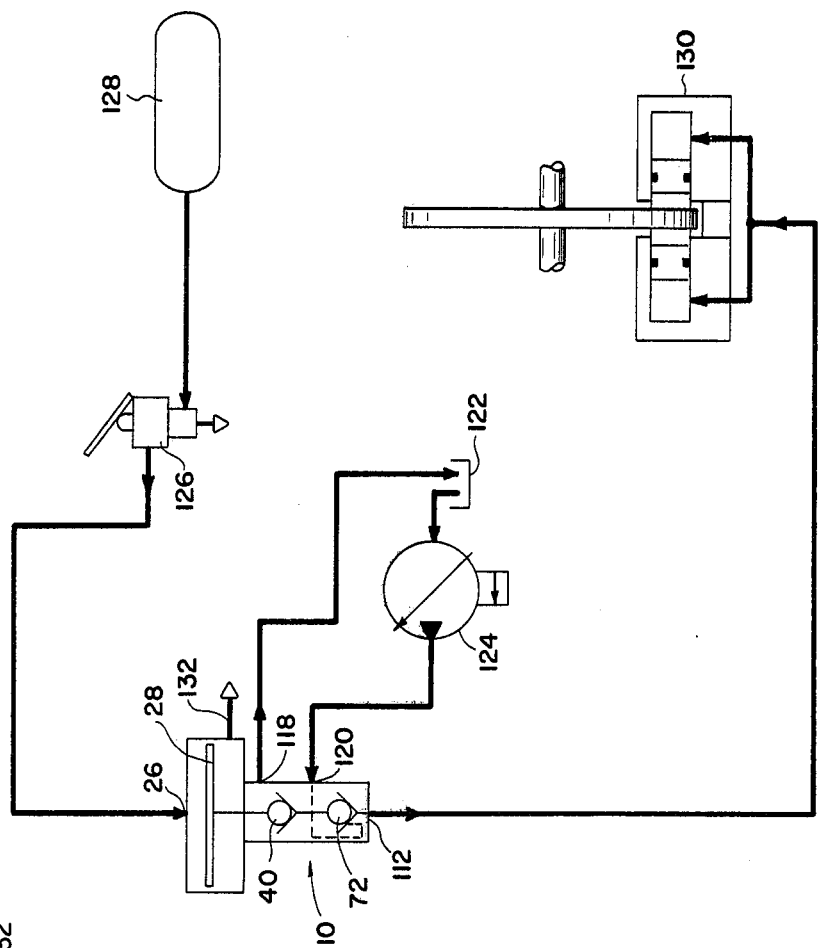
FIG. 3 is a schematic view of an application of the valve of FIG. 1 for supplying hydraulic fluid to a braking apparatus.

By way of example, and referring now to FIG. 3, assume that the valve 10 is to be utilized for controlling the application of hydraulic fluid pressure to the braking apparatus 130, which in this instance is a disc brake assembly wherein the brake discs are normally held in a non-braking position, and the application of hydraulic pressure is required for maintaining the brake discs in a braking position. The port 26 is operably connected with the valve 126, which may be a modulating brake valve, adapted for foot operation. The valve 126 is, in turn, in communication with a source of air or pneumatic pressure, such as the air cylinder 128. When the valve 126 is actuated by the foot of the operator of the braking system, the air pressure from the cylinder 128 is directed through the port 26 into the chamber 24 above the piston 28. The port 118 is in communication with the fluid accumulator 112, said fluid accumulator 122 also being in communication with the pump 124, and the port 120 is connected with the pump 124. The port 112 is in connection with the normal disc brake assembly 130 for supplying hydraulic pressure thereto and withdrawing hydraulic pressure therefrom.

In the normal position of the valve 10, as shown in FIG. 2, no air pressure is being applied at the pilot port 26, and the hydraulic fluid from the accumulator 122, being pumped from the accumulator 122 through the pump 124 and into the inlet bore 120, is locked or trapped in the bore 14 between the closed valve head 96 and the seal member 86. The area of the seal 86 is slightly greater than the area of the poppet 96; and as a consequence, the greater the fluid pressure from the pump 124, the tighter the valve 96 will seal against the valve seat 106. Any fluid which may seep through the valve head 96 will return to the fluid reservoir through the open passageway 76 and return port 118. Thus, no fluid pressure will be applied from the pump 124 to the braking apparatus 130.

As the foot-actuated air brake valve 126 is activated for directing air pressure from the cylinder 128 to the port 26, air pressure is gradually applied to the top of the piston 28, which moves downwardly against the force of the spring 62 and seats the poppet 40 firmly against the valve seat 82. Any hydraulic fluid beneath the piston 28 will be vented through the ports 66 for return to the fluid accumulator 122. Of course, additional vent ports may be provided in the housing portion 16, if desired, and, as indicated at 132 in FIG. 3, for facilitating relieving of the fluid pressure beneath the piston 28.

When the poppet 40 is firmly seated against the valve seat 82, no hydraulic fluid can pass from the passageway 76 to the return port 118. The application of additional air pressure against the top of the piston 28 will overcome the hydraulic pressure in the bore 14 between the closed valve head 96 and seal 86 and force the valve head 96 away from the valve seat 106, thus permitting the high pressure hydraulic fluid to rush into the bore 104 and out the discharge port 112 to the brake caliper assembly actuating the brakes 130.

If the foot pedal of the valve 126 is only partially depressed whereby the air pressure against the piston 28 is only approximately one-half of the maximum pressure, the valve 96 will fully open until pressure builds up between the port 112 and the braking apparatus 130. The hydraulic pressure under the valve head 96 will then balance the air pressure above the piston 28 and the valve head 96 will close against the valve seat 106 and preclude the passage of any additional fluid to the braking apparatus 130. The first poppet valve 40 will also remain seated against the seat 82 until the foot brake valve 126 is released slightly. If air pressure is reduced above the piston 28, the hydraulic fluid pressure beneath the piston 28 will raise the poppet 40, thus allowing excess hydraulic fluid pressure to return to the fluid accumulator or reservoir 122. Of course, if all of the air pressure is released from the top of the piston 28, the poppet 40 will open fully and stay open whereby all of the hydraulic pressure from the braking apparatus 130 will be vented or returned to the reservoir 122.

It will be readily apparent that the hydraulic pressure output of the valve 10 is a direct function of the pilot air pressure applied to the valve at the pilot port 26, and the hydraulic pressure output may be varied from zero to the maximum pressure of the hydraulic fluid system.

Figure 5:
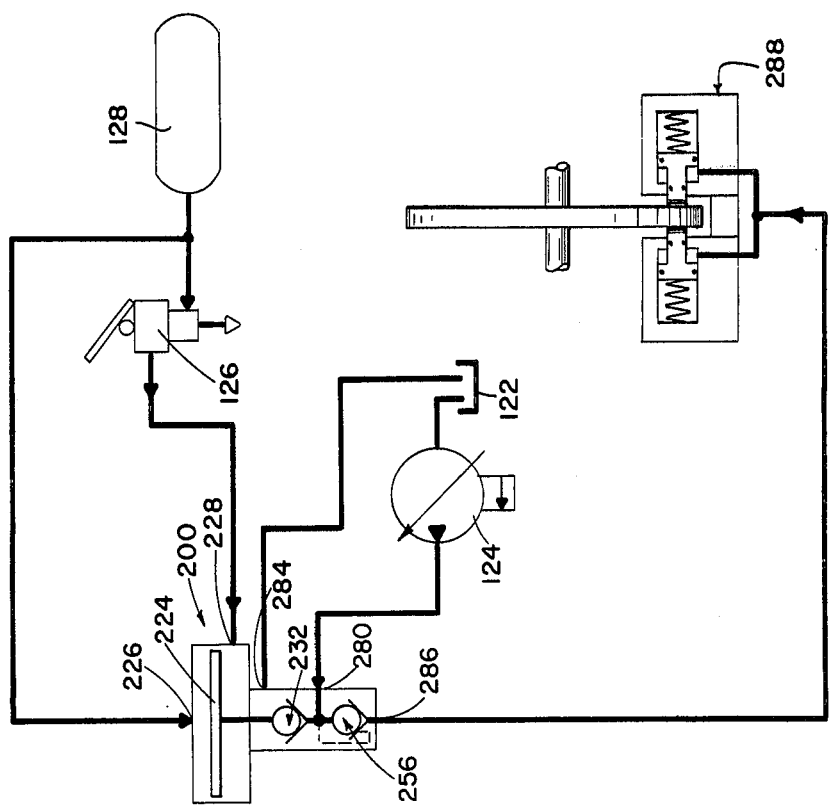
FIG. 5 is a schematic view of an application of the valve of FIG. 4 for supplying hydraulic fluid to a braking apparatus.
Figure 4:
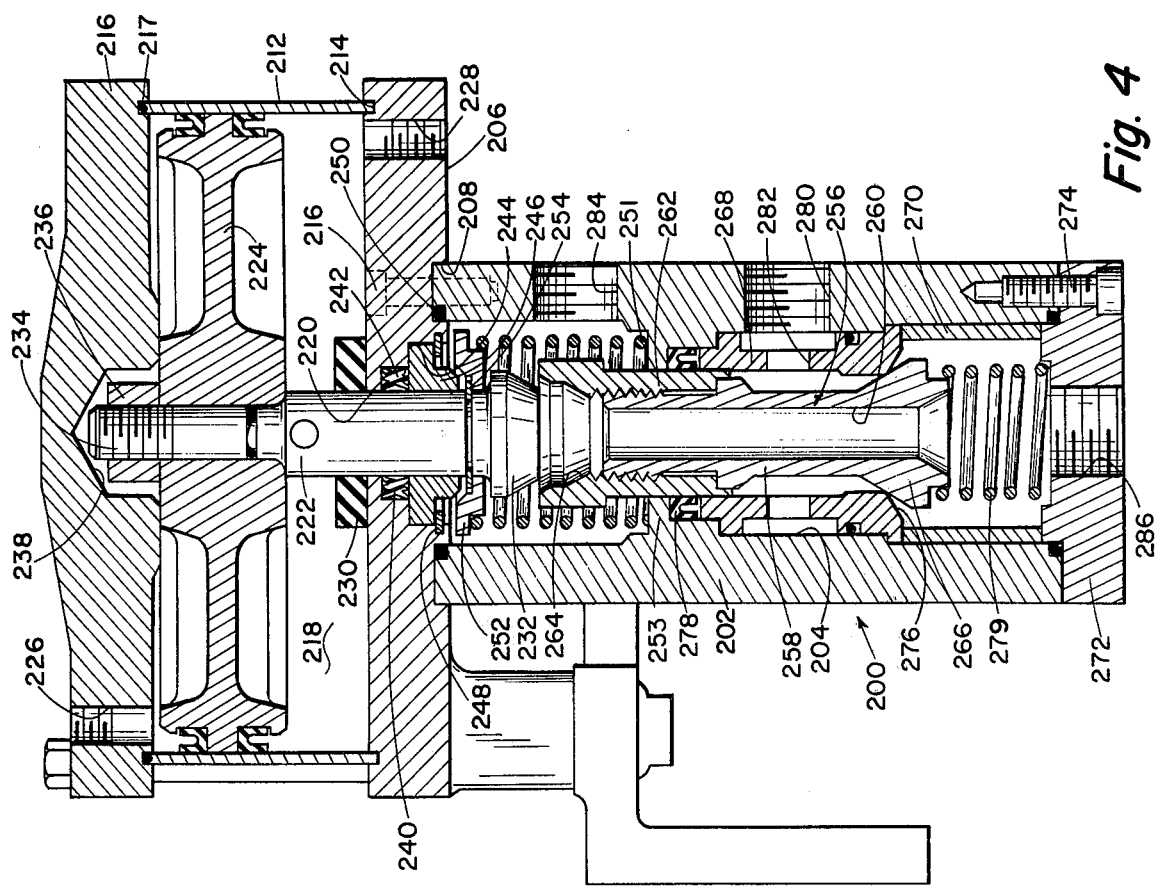
FIG. 4 is a sectional elevational view of a modified valve embodying the invention and depicts the valve in a closed position.

Referring now to FIGS. 4 and 5, a modified valve 200 generally similar to the valve 10 is shown and comprises a substantially tubular housing 202 having a bore 204 extending longitudinally therethrough. A plate member 206 is provided with a central recess 208 in one face thereof for receiving one end of the housing 202 therein whereby the plate 206 may be secured to the housing 202 in any suitable manner, such as by a plurality of bolts 210. A sleeve 212 has one end suitably secured in an annular recess 214 provided on the opposite face of the plate 206 with respect to the recess 208 and extends upwardly therefrom as viewed in FIG. 4 for supporting a second plate member 216 in spaced relation to the plate 206, thus providing a chamber 218 therebetween. Suitable sealing means 217 is preferably interposed between the sleeve 212 and plate 216 for precluding leakage of fluid therebetween.

A central bore 220 is provided in the plate 206 for slidably receiving a rod or stem 222 of a piston 224 therethrough. The piston 224, as shown herein, is disposed within the chamber 218 and is in sealing engagement with the inner periphry of the sleeve 212 as in the manner of the piston 28. An inlet port 226 is provided in the plate 216 in communication with the chamber 218 on one side of the piston 224, and an exhaust port 228 is provided in the plate 206 on the opposite side of the piston 224 with respect to the inlet port 226.

Of course, a suitable diaphragm (not shown) may be utilized in lieu of the piston member 224, if desired. In addition, an annular bumper member 230 is preferably disposed on the plate 206 in the chamber 218 and surrounding the stem 222 for absorbing the shock of the engagement of the piston 224 against the plate 206 during operation of the valve 220.

The piston rod 222 is preferably generally similar to the piston rod 38 and carries a suitable poppet valve 232 similar to the valve 40 at one end thereof. The opposite end thereof preferably extends beyond the piston 224 and is threaded at 234 for receiving a lock nut 236 thereon. In addition, a central recess 238 is preferably provided on the inwardly directed face of the plate 216 to provide clearance for the end 234 of the rod 222.

As hereinbefore set forth, the rod 222 extends slidably through the central bore 220 of the plate 206, and the poppet valve 232 is disposed below the plate 206 as viewed in FIG. 4, and within the bore 204 of the sleeve 202. The bore 220 is enlarged at 240 for receiving a suitable annular two way sealing member therein, and is further enlarged at 244 for receiving a suitable bushing member 246 therein. The bushing member 246 may be retained in position in any suitable manner, such as by a lock washer 248. In addition, suitable sealing means 250 is preferably interposed between the plate 206 and the sleeve 202 for precluding leakage of fluid therebetween.

A return spring 251 is anchored between an inwardly directed annular shoulder 254 of the bore 204 and a flange member 252 disposed around the stem of the poppet valve 232. The spring 251 acts against the flange 252 for retaining the flange in constant engagement with a lock washer 254 disposed on the stem of the valve 232 in spaced relation to the head of the valve. This provides a normal raised position for the poppet valve 232 and piston 224 as viewed in FIG. 4.

A second poppet valve generally indicated at 256 is slidably disposed within the bore 204. The valve 256 comprises a valve stem 258 having a central bore 260 extending longitudinally therethrough to provide a fluid passageway for the valve 256. A sleeve 262 is threadedly secured to one end of the stem 258 and is provided with an internal valve seat 264 for intermittently receiving the poppet valve 232 therein as in the manner of the valve seat 82. A valve head 266 is provided at the opposite end of the stem 258 with respect to the sleeve 262. A guide sleeve 268 is disposed within the bore 204 and concentrically arranged with respect to the valve stem 258. The sleeve 268 is supported within the bore 204 by a suitable spacer sleeve 270 which rests on the inwardly directed surface of an end cap 272 bolted or otherwise secured to the outer end of the sleeve 202 by means of a plurality of bolts 274. A valve seat 276 is provided on the inner periphery of the lowermost end of the guide sleeve 268 as viewed in FIG. 4 to provide a seat for the valve head 266 in much the same manner as the valve seat 106. In addition, a high pressure sealing means 278 is provided between the guide sleeve 268 and the shoulder 254, or bore 204, for precluding leakage of fluid therebetween. A second return spring 279 is suitable anchored between the valve head 266 and the cap 272 for constantly urging the valve head 266 in a direction toward the valve seat 276.

A high pressure inlet port 280 is provided in the sidewall of the sleeve 202, and in communication with suitable ports 282 provided in the guide sleeve 262. A second port 284 is provided in the sidewall of the sleeve 202 spaced from the first port 280 in such a manner that the sealing means 278 is interposed therebetween. The port 280 functions in the same general manner as the port 120, and the port 284 functions in the same general manner as the port 118. In addition, a port 286 is provided in the end cap member 272 in communication with the bore 204 for the same purpose as the bore 112.

The operation of the valve 200 is generally similar to the operation of the valve 10. However, a braking apparatus 288 may be used in combination with the valve 200 which is of the spring disc type wherein the spring urged discs are in normal braking engagement and the application of hydraulic fluid is necessary to maintain the braking apparatus in a released position. In this instance, a constant supply of pneumatic pressure, such as air pressure at one hundred PSI, may be supplied to the top of the piston 224 whereby full hydraulic pressure will be applied to the braking apparatus 288. The pressure keeps the braking apparatus fully released. As the foot valve 126 is applied, the air pressure may be directed beneath the piston 224 and vented from the top of the piston, which counterbalances the forces in the valve 200, allowing hydraulic pressure to bleed off gradually and allowing the springs of the disc brake to activate the brake. In this instance, any failure of either the air or hydraulic pressure will result in an instant application of the braking apparatus, thus providing a failsafe braking system as illustrated in FIG. 5.

Whereas the particular environment for use of the valves 10 and 200 as depicted herein is in a braking system, it is to be understood that the valves may be used for substantially any cylinder actuation in industry where a highly reliable and pressure sensitive system is desired. In the case of double acting cylinders, it would be necessary to utilize two of the novel valves with a twin modulating air pilot source.

From the foregoing, it will be apparent that the present invention provides a novel air-over-oil high pressure modulating valve wherein the hydraulic fluid pressure output is a direct function of the pilot air pressure imposed on the valve. Dual acting poppet valves are provided in the valve assembly whereby a controlled hydraulic pressure output may be provided in response to the control of the application of air pressure on the valve piston member. The novel valve is simple and efficient in operation and economical and durable in operation.

Whereas the present invention has been described in particular relation to the drawings attached hereto, it should be understood that other and further modifications, apart from those shown or suggested herein may be made within the spirit and scope of this invention.

What is claimed is:

1. An air over oil high pressure modulating valve comprising housing means having a pneumatic pressure chamber in communication with a longitudinally extending bore, piston means slidably disposed within said chamber, first poppet valve means carried by the piston means and extending into the bore, second poppet valve means slidably disposed within the bore and engageable by said first poppet valve means, valve seat means provided on said second poppet valve means for providing alternate closed and open positions for the first poppet valve means, vent port means provided in the housing in the proximity of the first poppet valve means for venting fluid pressure during opening and closing of said first poppet valve means, valve seat means provided on the inner periphery of the bore for providing alternate open and closed positions for the second poppet valve means, fluid passageway means extending through said second poppet valve means, pneumatic pressure inlet port means provided in communication with said chamber for applying pneumatic pilot pressure to one side of the piston means for selectively controlling the movement thereof within said chamber, hydraulic fluid inlet port means provided in said housing means and in communication with the bore, hydraulic fluid return port means provided in said housing means in communication with the bore for recirculation of hydraulic fluid through the housing, fluid trapping sealing means carried by the second poppet valve means and in sealing engagement with the bore and interposed between the hydraulic fluid input port means and hydraulic fluid outlet port means, hydraulic fluid outlet port means for controlled discharge of hydraulic fluid, said piston means being responsive to the pilot pressure and to pressure differentials acting thereon for closing the first poppet valve in one position of the piston and to preclude return of fluid pressure through the fluid pressure return outlet and for closing the first poppet valve means and simultaneously opening the second poppet valve means in another position of the piston means for providing said controlled discharge of hydraulic fluid through the outlet port means and for simultaneously closing both the first and second poppet valve means in another position of the piston means for trapping controlled hydraulic fluid pressure at the discharge port means, said fluid trapping sealing means cooperating with the trapped fluid pressure for increasing the sealing efficiency of the second poppet valve means in the closed position thereof, and wherein said fluid trapping sealing means comprises an outwardly extending annular shoulder provided on the outer periphery of the second poppet valve means and interposed between the hydraulic fluid inlet port means and hydraulic fluid return port means, and an annular seal being disposed around the outer periphery of the second poppet valve means and in engagement with the shoulder whereby one face of the seal ring is open at the hydraulic pressure surrounding the poppet valve in the proximity thereof.

2. An air over oil high pressure modulating valve as set forth in claim 1 and including spring means cooperating between the housing means and piston means for constantly urging the piston in one direction for maintaining a normal open position for the first poppet valve means.

3. An air over oil high pressure modulating valve as set forth in claim 1 and including spring means cooperating between the housing means and the second poppet valve means for maintaining the second poppet valve means in a normally closed position.

4. An air over oil high pressure modulating valve as set forth in claim 1 wherein the area of said seal means is greater than the area of said second poppet valve means.

5. An air over oil high pressure modulating valve as set forth in claim 1 wherein the piston means comprises a piston member slidably disposed within said housing means and having one face in communication with the pneumatic pressure inlet port means, seal means provided around the outer periphery of the piston member and engageable with the inner periphery of the housing means for precluding leakage of fluid therebetween, piston rod means carred by the piston member and having a central bore extending longitudinally therethrough for receiving said first poppet valve means therein whereby said first poppet valve means moves simultaneously with said piston member.

6. An air over oil high pressure modulating valve as set forth in claim 1 wherein the second poppet valve means comprises a stem member slidably disposed in said housing means, an enlarged head member provided on one end of said stem member for providing said valve seat for said first poppet valve means, a valve head member removably secured to the opposite end of the stem member and engageable with the housing means for providing said alternate open and closed positions for the second poppet valve means, and seal means provided on the outer periphery of the stem member and interposed between the hydraulic fluid inlet port means and hydraulic fluid return port means for precluding leakage of fluid therebetween, said seam means having an area greater than the area of the valve head member.

* * * * *